United States Patent [19]

Allen et al.

[11] Patent Number: 4,754,832

[45] Date of Patent: Jul. 5, 1988

[54] SKI AND MOUNT FOR FOUR WHEEL VEHICLE

[76] Inventors: John W. Allen, 19726 Redwood Rd.; Douglas D. Banghart, 20642 John Dr., #10, both of Castro Valley, Calif. 94546

[21] Appl. No.: 52,642

[22] Filed: May 20, 1987

[51] Int. Cl.$^4$ .................. B62M 27/02; B62B 13/18; B62B 19/00

[52] U.S. Cl. .................................... 180/196; 280/9

[58] Field of Search ............... 180/182, 196, 186, 192; 280/9

[56] References Cited

U.S. PATENT DOCUMENTS

| | | | |
|---|---|---|---|
| 1,314,666 | 9/1919 | Horner | 180/192 |
| 1,454,105 | 5/1923 | Coffey et al. | 180/192 |
| 3,132,873 | 5/1964 | Sychowski et al. | 280/9 |

*Primary Examiner*—John A. Pekar
*Attorney, Agent, or Firm*—Townsend and Townsend

[57] ABSTRACT

A single ski is disclosed for central mounting under a four wheel vehicle, preferably a vehicle having four wheel drive. This single ski is mounted to the underside of the vehicle and includes a jacking mechanism for raising and lowering the ski in parallel relation with respect to the snow covered ground. The single ski extends longitudinally of the vehicle, centrally between the wheels on the left side of the vehicle and the wheels on the right side of the vehicle. The length and width of the ski is sufficient to remove substantially equal weight from both the front and rear tires of the vehicle. The surface area of the ski is sufficient to maintain the depth of the ski at a level no lower than the lowest point of the tires in soft or powder snow. In operation, the ski is lowered a sufficient distance to remove weight evenly from the wheels of the vehicle to an extent that the tires no longer accumulate a blocking drift of snow in their path of advance. Thereafter, the driving wheels provide propulsion and some support while the ski provides the requisite lubrication for firm, safe and stable support over the snow. The tires of the vehicle co-act with the single ski to produce driving and steering outriggers to prevent capsizing of the vehicle. Provision for steering of the vehicle is made either by conventional steering of the front steering wheels or alternately by providing for articulation of the vehicle supported ski responsive to vehicle steering.

8 Claims, 3 Drawing Sheets

SKI AND MOUNT FOR FOUR WHEEL VEHICLE

This invention relates to skis. More specifically, this invention relates to a single ski supported on the underside of an all terrain vehicle for converting the all terrain vehicle to winter use.

SUMMARY OF THE PRIOR ART

Tires in the snow are unsatisfactory especially in soft snow. Typically the tires accumulate in their intended path of advance a blocking drift of snow. This snow blocks the forward advance of the tire. At the same time, if the tire is powered rotation continues. Snow is excavated from under the tire. Typically, the tire digs itself axial deep into the snow. Advance of the vehicle stops.

Specialized snow vehicles are known. As most pertinent to the disclosure herein, so-called "snow mobiles" are a combination of endless tracks and skis. Typically, the rear portion of the vehicle is driven by at least one endless track. The track has sufficient area contact with the snow so that digging into and miring in the snow does not occur. Skis are placed in front of such vehicles. These skis ride and turn on the snow. Steering of the vehicle results.

It is known to provide a conventional vehicle with steering skis. See Sychowski et al. U.S. Pat. No. 3,132,873. In this apparatus, steering skis at the front of a conventional four wheel vehicle remove weight and steer a vehicle. No provision is made for the support of the rear wheels. Consequently the resultant vehicle is not intended for all terrain use.

So-called all terrain vehicles are known. These vehicles have four driven wheels and can be equipped with four wheel drive. The tires of such vehicles are large and formed with protruding lugs. As will hereinafter be set forth, this invention is preferably used with such vehicles.

SUMMARY OF THE INVENTION

A single ski is disclosed for central mounting under a four wheel vehicle, preferably a vehicle having four wheel drive. This single ski is mounted to the underside of the vehicle and includes a jacking mechanism for raising and lowering the ski in parallel relation with respect to the snow covered ground. The single ski extends longitudinally of the vehicle, centrally between the wheels on the left side of the vehicle and the wheels on the right side of the vehicle. The length and width of the ski is sufficient to remove substantially equal weight from both the front and rear tires of the vehicle. The surface area of the ski is sufficient to maintain the depth of the ski at a level no lower than the lowest point of the tires in soft or powder snow. In operation, the ski is lowered a sufficient distance to remove weight evenly from the wheels of the vehicle to an extent that the tires no longer accumulate a blocking drift of snow in their path of advance. Thereafter, the driving wheels provide propulsion and some support while the ski provides the requisite lubrication for firm, safe and stable support over the snow. The tires of the vehicle co-act with the single ski to produce driving and steering outriggers to prevent capsizing of the vehicle. Provision for steering of the vehicle is made either by conventional steering of the front steering wheels or alternately by providing for articulation of the vehicle supported ski responsive to vehicle steering.

OTHER OBJECTS, FEATURES AND ADVANTAGES

An object of this invention is to disclose a single ski for mounting under a four wheel drive vehicle. The single ski is mounted to the underside of the vehicle parallel to the path of the vehicle and includes an upturned front and a jack for raising and lowering the ski in parallel relation with respect to the ground. The ski extends longitudinally of an all terrain vehicle midway between the wheels on the left side of the vehicle and the wheels on the right side of the vehicle. The length of the ski is sufficient to remove substantially equal weight from both the front tires and the rear tires of the vehicle. The surface area of the ski is sufficient to maintain the depth of the ski at a level no lower than the lowest points of the tires in soft or powder snow. In operation, the ski is mounted to the underside of the all terrain vehicle and is lowered a sufficient distance to remove weight from all the vehicle wheels equally. Weight is removed from the wheels to a sufficient extent to prevent the accumulation of a miring drift of snow in the path of the wheels. The ski provides the requisite lubrication for movement of the vehicle through the snow; the wheels provide both support driving and optionally steering for propelling the vehicle in snow.

An advantage of the invention is that an all terrain vehicle, preferably four wheel drive, is modified to obtain full capabilities of a snow mobile. At the same time, and through removal of the single central ski, the vehicle can be converted back to conventional all terrain use when snow is no longer present.

A further advantage of this invention is that the mechanism for raising and lowering the ski permits the vehicle to operate in all kinds of snow conditions. Where the snow is hard and the wheel traction relatively solid, small downward movement of the ski is required. Where the snow is soft and forward wheel movement easily mired, large downward movement removes sufficient weight from the wheels to prevent miring of their advance.

Yet another advantage of the single central ski disclosed is that conventional steering of the vehicle can occur. Specifically, the wheels of the vehicle have sufficient weight removed to the ski so that the wheels co-act with the ski in conventional steering and propulsion.

A further object of this invention is to disclose an attachment for all terrain vehicles which can be attached to such existing vehicles to modify them for winter use. According to this aspect of the invention, the ski and jacking mechanism is fabricated as a unit. This unit can be conveniently owner attached to winterize an all terrain vehicle.

A further object of this invention is to disclose an articulated central ski. According to this aspect of the invention, the central ski is provided with an articulated forward portion permitting side-to-side rotation of the forward part of the ski. The articulated forward portion attaches to the steering column or rods of the all terrain vehicle. The forward portion of the ski articulates in sympathy with the vehicle steering to provide improved steering to the vehicle.

Other objects, features and advantages of this invention will become more apparent after referring to the following specification and attached drawings in which.

Figure 1:
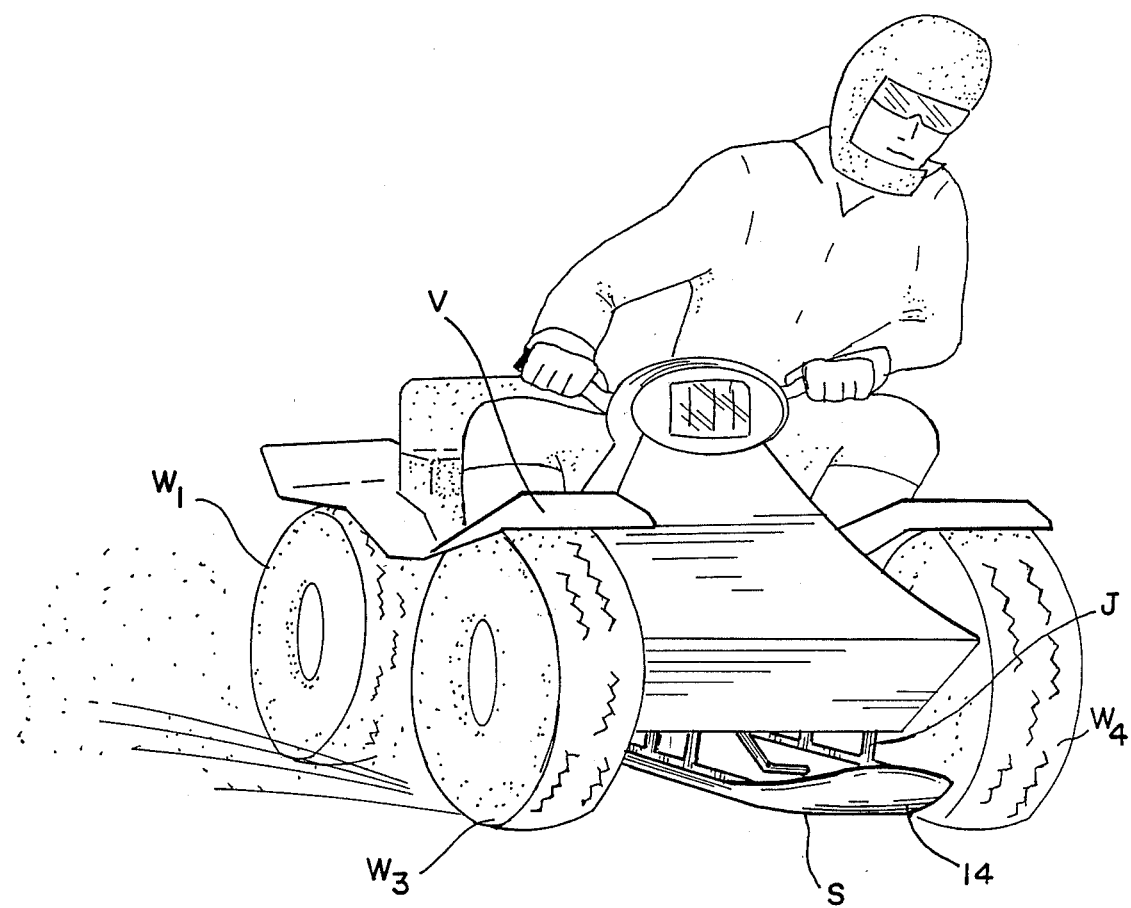
FIG. 1 is a perspective view of a user on an all terrain vehicle riding through the snow.

Referring to FIG. 1, an all terrain vehicle V is illustrated. The vehicle includes rear wheels W1 and W2 (not shown) and front wheels W3 and W4. The central ski S is illustrated lowered by means of a jacking rack J. The ski S has an upturned forward end 14 and is suspended centrally under the vehicle. If all terrain vehicle V did not have ski S mounted thereunder, it would mire in the snow.

Typically, as the vehicle attempted to advance into the snow, a blocking mass of snow would accumulate in front of the wheels. This accumulating snow would block the advance of the vehicle.

Assuming further rotation on the part of either the rear wheels W1, W2 or all four wheels W1–W4, the wheels would slowly dig their way into the snow. The vehicle would be mired axial deep.

Central ski S stops this miring. Specifically, it is lowered to an extent where weight is equally removed from the wheels W1–W4. The wheels thereafter become conventional in their operation in conjunction with the ski. The wheels serve to propel and steer the ski supported vehicle over snow conditions. The ski S provides support.

Jacking mechanism J makes the vehicle adaptable to all types of snow conditions. Specifically, for hard snow conditions, ski S is lowered only partially.

For soft snow conditions, ski S is lowered more fully. Lowering need only occur to prevent miring of the respective wheels W1–W4 and optimal driving of the vehicle through the snow.

The invention herein is adaptable to two specific configurations. First with respect to FIG. 2A and 2B is the preferred single central ski for mounting under the illustrated all terrain vehicle.

Figure 3A:
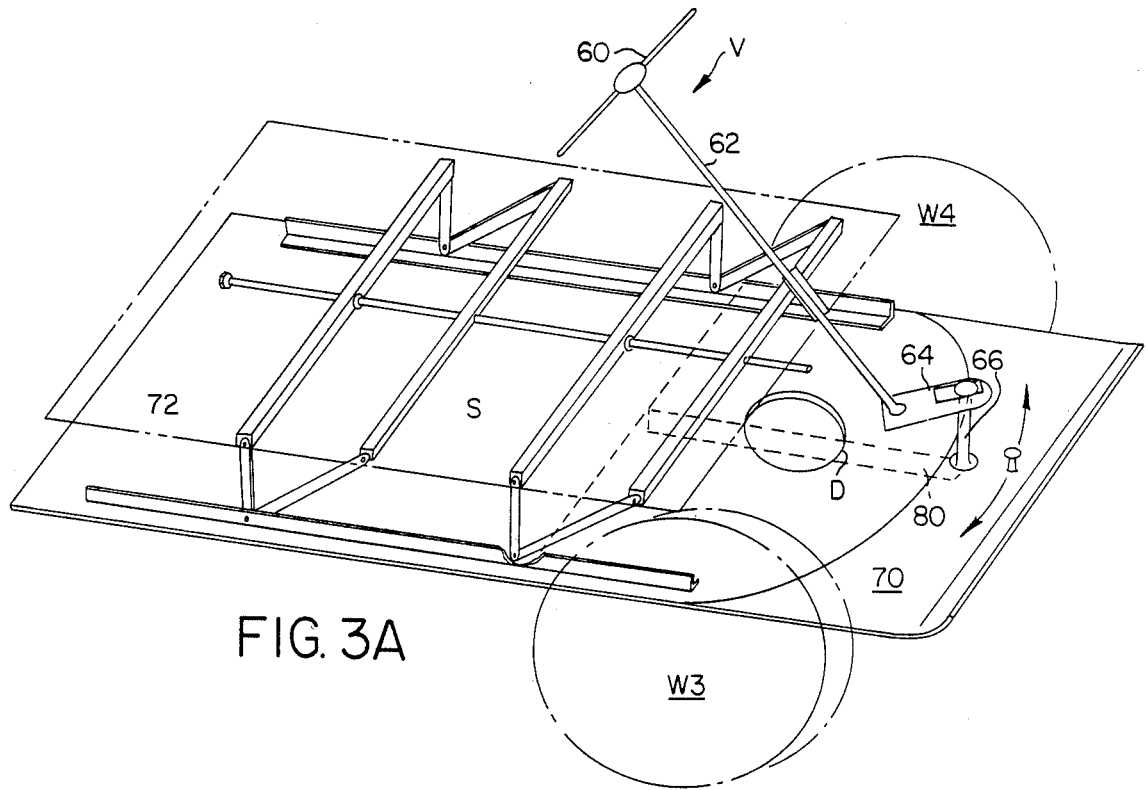
FIG. 3A is a perspective view of an articulating ski showing additionally a perspective of the steering mechanism of the all terrain vehicle and a link for sympathetic articulation of the ski responsive to conventional steering of the all terrain vehicle.
Figure 3B:
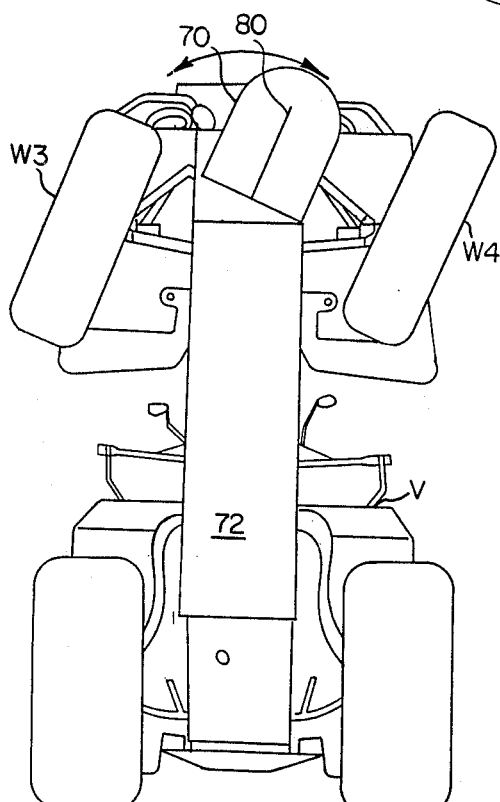
FIG. 3B is a bottom plan view of an all terrain vehicle illustrating the articulation of the ski and sympathetic steering of the wheels.

Secondly, and with reference to FIGS. 3A and 3B is an articulated single central ski which articulates side-to-side responsive to the steering mechanism of the vehicle to assist steering.

Figure 2A:
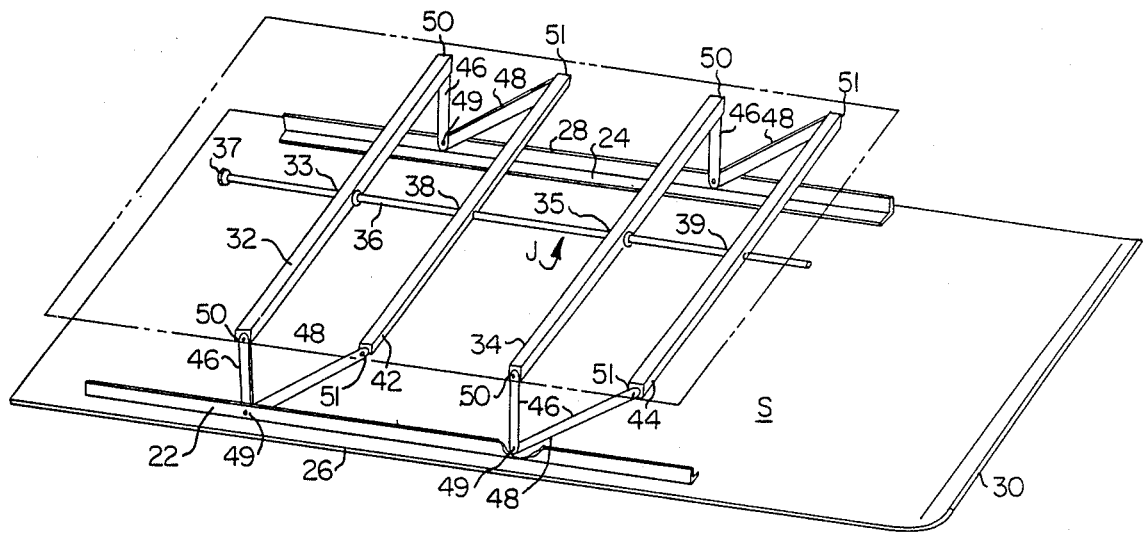
FIG. 2A is a perspective view of the single ski ready for attachment to the bottom of an all terrain vehicle.
Figure 2B:
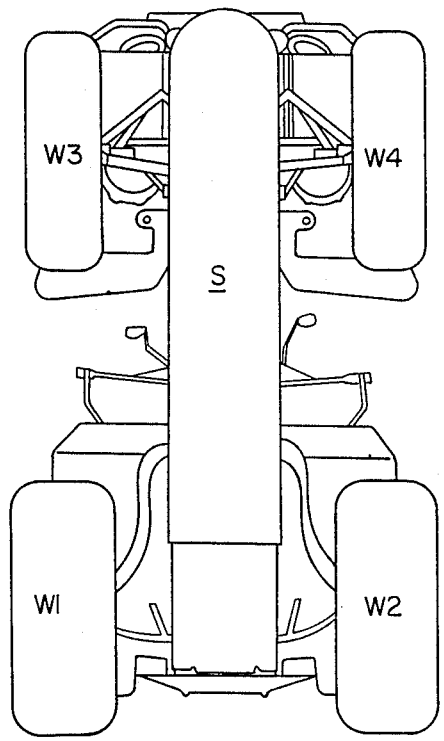
FIG. 2B illustrates a bottom plan of the all terrain vehicle showing the ski of FIG. 2A attached thereto.

Referring to FIG. 2A, a single unitary ski S is illustrated. Ski S includes two angle bars 22, 24 mounted to respective side edges 26, 28 of the ski. As is conventional, ski S includes an upturned forward edge 30 in the direction of forward advance of the ski.

The ski includes a jacking mechanism J which jacking mechanism can be easily understood. Specifically, fixed bars 32, 34 are made for mounting to the bottom of the vehicle. These bars are centrally bored at 33, 35 to receive a threaded shaft 36. Shaft 36 remains stationary and is fixed as by bushings at bores 33, 35. Threaded shaft 36 is threaded to bores 38, 39 on moving cross members 42, 44.

Bars 22, 24 are attached to the respective ends of fixed bar 32 and moving bar 42 by links 46 48. These links are pivotally mounted at their distal ends to a single pivot point 49 at bar 22 and paired pivot points 50 and 51 on respective bars 32, 42. The lengths of the links on opposite sides of ski S are identical.

Forward bar 34 and 44 is similarly connected by similar and identically numbered links.

It can be seen that rotation of shaft 36 will move the respective bars 32, 42 and 34, 44 towards and away from one another. Assuming bars 32, 42 and 34, 44 are moved towards each other, mechanism J will lower ski S. Assuming bars 32, 42 and 34, 44 are moved away from one another, jacking mechanism J will raise ski S.

Rod 36 is here shown with a bolt 37 for manually raising and lowering ski S. It will be understood that such raising and lowering may well be automatic as by attachment of a hydraulic motor.

Referring to FIG. 2B, the dimension of the single ski S relative to the vehicle can be understood. Typically, ski S is centrally located longitudinally of the vehicle. That is to say it is evenly centered between wheels W1, W3 on one side and wheels W2, W4 on the opposite side.

Ski S extends from the front wheels W3, W4 all the way rearwardly to at least the vicinity of the rear wheels W1, W2. Length is chosen so that weight is equally removed from all wheels of the vehicle. Thus, lowering of ski S causes weight to be locally removed from all the wheels. It does not cause weight to be removed from one set of wheels while weight on the other set of wheels remains unchanged.

Ski S is preferably used with an all terrain vehicle. Such vehicles are manufactured by the Honda Corporation of Tokyo, Japan and have oversized tires with molded and protruding rubber lugs for improved traction. Such a vehicle is sold under the trademark FOUR-TRAX 200SX and preferably includes four wheel drive.

It will be understood that mounting to the underside of the vehicle is easily accomplished. Specifically, bars 32, 34 are fixed to the vehicle. Bars 42, 44 remain free to move relative to the bottom of the vehicle. This enables ski S to be raised and lowered for all types of snow conditions.

Having set forth the preferred ski S of FIGS. 2A and 2B, the modification of the invention to include an articulated ski can be understood with respect to FIGS. 3A, 3B.

In FIG. 3A, a portion of the overlying vehicle V is illustrated at respective wheels W3 and W4 as well as steering handle 60 and steering column 62. Specifically, column 62 has attached at the lower end thereof a bracket 64. Bracket 64 attaches to a lug 66.

Ski S articulates side-to-side. Specifically, ski S is provided with a pivot P comprising a circular bearing. Forward portion of ski S at 70 is free to move relative to the rearward portion of the ski at 72.

Operation of the simple articulating device is easily understood. As handle 60 turns steering column 62 and lug 64 likewise turn. Lug 64 through ski attached column 66 causes the forward portion of ski S at 70 to pivot on pivot P. Articulation of portion 70 relative to portion 72 occurs. Such articulation occurs in sympathy with the steering of the wheels.

Referring to FIG. 3B and the broken lines in FIG. 3A it is seen that a small skeg 80 can be attached to the bottom of the forward portion 70 of the ski. This will further assist articulation and resultant steering.

The operation of the articulated ski is easily understood. Referring to the view of FIG. 3B, it can be seen that wheels W3 and W4 have turned. At the same time, the forward portion 70 of the ski has articulated with respect to the rear portion 72.

It will be noted that in the case of both ski S, the ski does not extend fully rearward of the rear and driving wheels. This is because it has been found that in order for optimal removal of the weight of the wheels from the snow to occur, as the vehicle proceeds forwardly, a fully extending rearward ski is not required. Removal of the weight from the rear wheels can be accomplished by a ski extending less than the full length of the vehicle. It is, however, important to note that the weight removal from the rear wheels is substantially equal to the weight removal from the front wheels as the vehicle V proceeds in the forward direction.

It will additionally be appreciated that in the preferred type of all terrain vehicle V here utilized, that the wheels and central skis co-act in their support of the vehicle over the snow. However, the central ski S acts to remove sufficient weight from the wheels to prevent miring and resultant blockage of the passage of the vehicle over the snow.

We prefer a single central unitary ski on the vehicle. However, two or more skis could be used to practice this invention so long as the ski edges do not appreciably interfere with required steering through the snow.

Some dimensions and weights can be instructive. The all terrain vehicle illustrated is about five feet long and four feet wide with a weight of 352 pounds, not including the rider. Thus, weights in the range of 550 pounds can be anticipated.

The ski is 36 inches in length and 10 inches in width. Assuming that one-half the weight of the vehicle is on the tires and the other half of the weight of the vehicle is on the ski, ski pressure on the snow will be in the range of less than one pound per square inch of ski surface.

Heavier vehicles require more substantial skis. For example an all terrain vehicle having four wheel drive will weigh in the range of as much as 600 pounds less the rider. Thus weights in the range of 800 pounds including the rider can be anticipated. For such vehicle we use a ski 48 inches in length and 12 inches wide. Assuming that one-half the weight of the vehicle is on the tires, ski pressure on the snow will be again in the range of less than one pound per square inch of ski surface.

Typical ski lengths and placements are a function of the length of the vehicle. For a vehicle four feet in length a ski three feet in length is used. The ski starts at the front of the vehicle, even with the two front wheels, and ends at a point three quarters the length of the vehicle immediately ahead of the two rear wheels. Similar length ratios are used in longer vehicles.

Other modifications can be made by those having skill in the art.

What is claimed is:

1. A ski for mounting to the underside of an all terrain vehicle, said all terrain vehicle having at least four wheels including two forward turning wheels for permitting said vehicle to be steered and at least two powered wheels for permitting said vehicle to move over the ground, one said steering wheel and one said powered wheel being on one side of said vehicle and one other said steering wheel and one other said powered wheel being on the opposite side of said vehicle; said ski comprising:
   a ski for contact with snow passing under said vehicle, said ski having an up turned forward edge;
   means for jacking said ski towards and away from said all terrain vehicle in substantial parallel relation to the ground;
   means for mounting said ski to the underside of said all terrain vehicle at a central location between said wheels on opposite sides of said vehicle;
   said ski having a length, width and central location with respect to the underside of said vehicle to permit substantially equal weight removal from all wheels of said vehicle as said ski is jacked towards said snow and said vehicle proceeds through the snow.

2. The ski of claim 1 and wherein said ski is a large single unitary ski.

3. The invention of claim 1 and wherein said ski has a forward portion mounted for side-to-side articualtion with respect to a rearward portion of said ski; and means for connecting said forward portion to steering of said all terrain vehicle.

4. In combination an all terrain vehicle, said all terrain vehicle having at least four wheels including two forward turning wheels for permitting said vehicle to be steered and at least two powered wheels for permitting said vehicle to move over the ground, one steering wheel and one powered wheel being on one side of said all terrain vehicle and one other steering wheel and one other said powered wheel being on the opposite side of said vehicle;
   a ski for contact with snow passing under said vehicle, said ski having an upturned forward edge;
   means for jacking said ski towards and away from the bottom of said all terrain vehicle in substantially parallel relation to the ground;
   means for mounting said ski to the underside of said all terrain vehicle at a central location between said wheels on opposite sides of said vehicle; said ski having a length, width and central location with respect to said vehicle to permit substantially equal weight removal from all wheels of said vehicle as said ski is jacked towards said snow and said vehicle proceeds through snow whereby said wheels propel said vehicle while asaid ski prevents said wheels from being mired in the snow.

5. The invention of claim 4 and wherein said forward wheels of said vehicle steer said vehicle and attached ski.

6. The invention of claim 4 and wherein said rearward wheels of said vehicle only are driven.

7. The invention of claim 4 and wherein said ski includes a large single central unitary ski.

8. The invention of claim 4 and wherein said ski articulates at the forward portion thereof in side-to-side relation; and means interconnecting the forward articulating portion of said vehicle to said steering for permitting said articulated portion of said ski to assist in steering of said vehicle through the snow.

* * * * *